July 30, 1963 H. A. SCHEEL Re. 25,429

RESIN MOLDED FABRIC

Original Filed Jan. 25, 1961

INVENTOR
HENRY A. SCHEEL
BY
ATTORNEY

United States Patent Office

Re. 25,429
Reissued July 30, 1963

25,429
RESIN MOLDED FABRIC

Henry A. Scheel, Mystic, Conn., assignor to A. Wimpfheimer & Bro. Inc., Stonington, Conn., a corporation of New York Original No. 3,045,319, dated July 24, 1962, Ser. No. 84,914, Jan. 25, 1961. Application for reissue Aug. 31, 1962, Ser. No. 221,411
6 Claims. (Cl. 28—80)

Matter enclosed in heavy brackets [ ] appears in the original patent but forms no part of this reissue specification; matter printed in italics indicates the additions made by reissue.

This invention relates to fabrics of the type suited to be resin impregnated and molded to form a structural member, insulation board, duct, or the like.

An object of the invention is to provide a fabric of the above type which is capable of being impregnated with a substantial amount of impregnant.

Another object is to provide an impregnated fabric which is resistant to heat and corrosion.

A further object is to provide an impregnated fabric which is readily fabricated into various shapes and sizes.

Other objects and advantages will be apparent as the nature of the invention is more fully disclosed.

In accordance with the invention a two-ply fabric is woven on a standard double shuttle loom to form a fabric having a pair of woven plies which in certain areas are spaced apart and joined by tie yarns which extend between the two plies to form a filling. In other selected areas the two plies are contiguous and are bound together by binder yarns. These latter areas may constitute spaced stripes in the warpwise direction or in the fillerwise direction or in both directions as desired. After the fabric has been thus woven in a sheet or strip it can be cut into various shapes along the stripe areas without exposing the tie areas and without ravelling. The fabric can be impregnated either before or after such cutting or trimming.

To facilitate the penetration of the impregnant, particularly when long lengths of the fabric are to be impregnated, straight stuffer yarns can be woven in spaced parallel groups along the tie areas. These stuffer yarns can be made of wicking material for absorbing and wicking the impregnant along the fabric. This feature is of particular importance if the fabric is made of non-pervious yarns such as spun or continuous filament glass yarns which do not in themselves absorb the impregnant.

The nature of the invention will be better understood from the following description, taken in connection with the accompanying drawing in which a specific embodiment has been shown for purposes of illustration.

Figure 1:
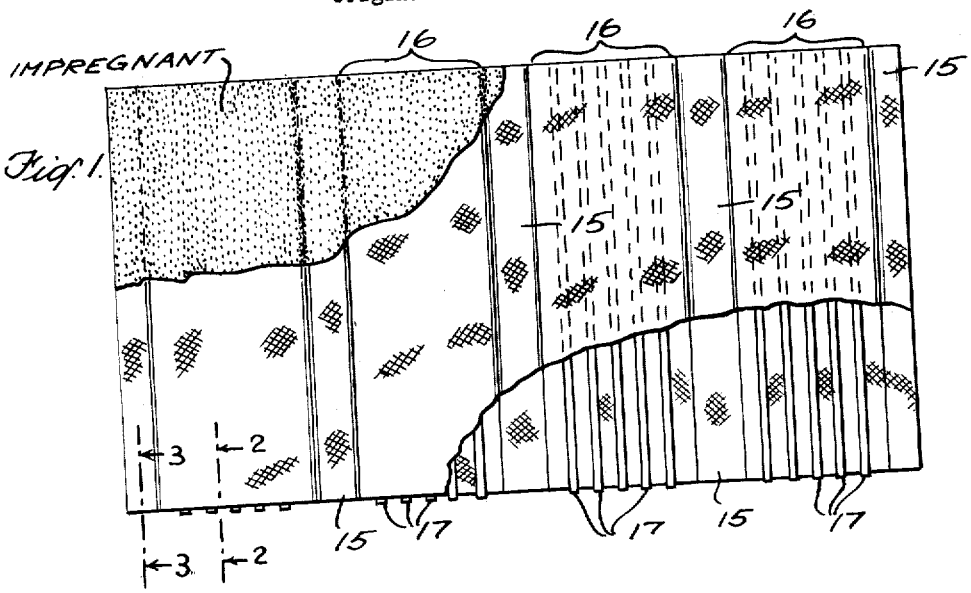
FIG. 1 is a broken plan view of a fabric embodying the invention.
Figure 2:
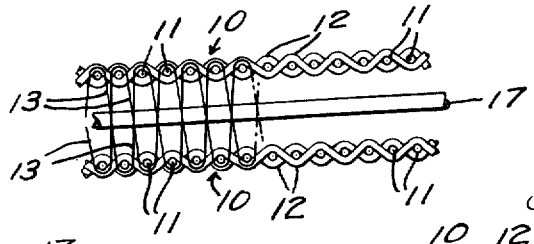
FIG. 2 is a warpwise section taken on the line 2—2 of FIG. 1.
Figure 3:
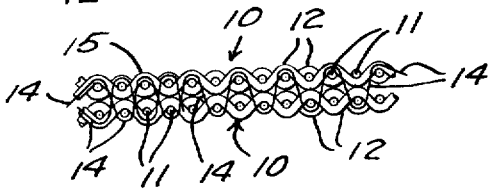
FIG. 3 is a warpwise section taken on the line 3—3 of FIG. 1.

Referring to the drawing more in detail the invention is shown as embodied in a fabric having a pair of plies 10, each composed of weft yarns 11 and warp yarns 12 interwoven in the usual manner. Tie warps 13 are cross-woven between the two plies 10, as shown in FIG. 2. The tie yarns 13 are woven over alternate weft yarns 11 of the upper ply 10, then cross to the lower ply 10 to pass under alternate weft yarns 11 of the lower ply and return in a repeated pattern. The tie yarns may of course be woven under and over three or more weft yarns 11 of each ply before crossing to the other ply if desired, in which case successive picks of the tie yarns will be offset by one or more weft yarns so as to provide a uniform distribution through the fabric. The yarns 13 form a tie between the two outer plies in a manner well known in double shuttle velvet weaving.

Binder warp yarns 14 are woven in a manner similar to the tie yarns 13 except that the binder warps are placed under a tension adapted to bring the two plies 10 into juxtaposition so that no substantial space is formed between the two plies in the areas of the binder yarns 14. In the form shown the binder yarns 14 are disposed in stripes 15 which are spaced across the fabric to provide panels 16 therebetween containing the tie yarns 13.

The stripes 15 form in effect a selvage along the edges of the fabric and a binding for the panels 16. When the fabric is cut along these stripes 15 the tie yarn areas 16 are enclosed thereby and the edges of the fabric do not tend to fray or ravel.

If desired, transverse stripes corresponding to the warpwise stripes 15 can be woven in the fabric by varying the tension of the tie warp 13 at the selected areas so that the outer plies 10 are pulled together at such areas. In this way provision can be made for cutting the fabric transversely at various intervals.

A plurality of stuffer yarns 17 are shown as laid in spaced parallel relationship between selected tie yarns 13. The stuffer yarns are laid in channels where the tie yarns 13 are omitted and are not bound into the fabric.

The fabric, either before or after cutting to size is impregnated with an impregnating resin such as a phenolic condensation resin or an epoxy resin or other resin having thermosetting properties, or by a thermoplastic type resin such as polyethylene or a vinyl resin depending upon the end use to which the fabric is to be put. In the case of a thermosetting resin the impregnated fabric can be dried but not cured as a preliminary step after which it can be molded to shape and cured to form a rigid product which cannot again be softened by heat. If thermoplastic resins are used the fabric will be molded to form prior to curing but can be resoftened by heat.

For a structural unit or for a duct which is moldable to a complex form and is resistant to moderately high temperatures and to corrosion the fabric is preferably made of a spun glass yarn or the like throughout with the exception of the stuffer yarns 17 which are composed of a wicking or absorptive material such as cotton. These stuffer yarns thus aid the penetration of the impregnant. These yarns may extend either warpwise or weft-wise according to the product desired.

Figure 4:
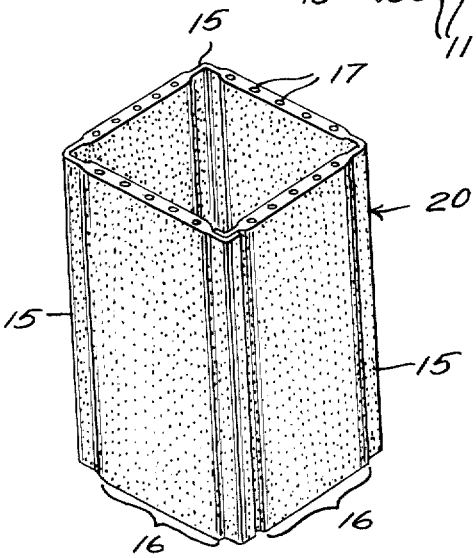
FIG. 4 is partial perspective of a duct composed of the fabric of FIG. 1.

As an example of one type of end product a square duct 20 is shown in FIG. 4. This duct is formed by bending the fabric along the stripes 15 to form the corners with the two side edges overlapping and bonded together by the cured resin. The conduct must be shaped before the final heat curing of the resin.

Various other adaptations and uses of the invention will eb apparent to a person skilled in the art.

What is claimed is:

1. A two-ply fabric comprising a pair of plies of woven fabric, each of said plies having interwoven filler yarns and warp yarns, said plies in certain areas being spaced apart and having tie yarns woven into and extending between the plies and in other areas being in substantial contact and having binder yarns extending between the plies to bind the same together, said tie yarns being disposed to leave a straight open channel extending entirely through the tie yarn areas and stuffer material having wicking characteristics, disposed in and extending along said channels, said stuffer material being free from said tie yarns.

2. A two-ply fabric as set forth in claim 1 which is impreganted with a thermosetting resin, said resin being in the heat set and cured state, said impregnated fabric constituting a rigid product.

3. A two-ply fabric as set forth in claim 1 in which said stuffer material constitutes yarns.

4. A resin impregnated fabric element comprising a pair of plies of woven fabric, each of said plies having interwoven filler yarns and warp yarns, said plies in certain areas being spaced apart and having tie yarns woven into and extending between the plies, said plies in other areas being in substantial contact and having binder yarns extending between the plies to bind the same together, said other areas constituting warpwise stripes extending in spaced parallel relationship in a warpwise direction along said fabric, said tie yarn areas constituting panels between adjacent warpwise stripes, said tie yarns being disposed to leave straight open channels extending entirely through the tie areas, and wicking material disposed in and extending along said channels, said fabric, the space between said plies in the tie yarn areas and said wicking material being impregnated with a thermosetting resin, said fabric being folded along said stripes and said resin being in the heat set and cured state.

*5. A resin-impregnated rigid fabric element comprising a pair of plies of woven fabric, each of said plies having interwoven filler yarns and warp yarns, said plies being spaced apart uniformly and having tie yarns woven into and extending between the plies, said tie yarns being disposed to leave straight open channels extending entirely through the fabric and stuffer yarns having wicking characteristics disposed in and extending along said channels, said plies of woven fabric, the space between said plies, and said stuffer yarns being impregnated with a resin, said resin being in the cured state whereby said impregnated fabric constitutes a rigid product.*

*6. A rigid product as set forth in claim 5 having high strength characteristics wherein at least said filler yarns, warp yarns and tie yarns are composed of glass fiber yarns.*

References Cited in the file of this patent
or the original patent

UNITED STATES PATENTS

| | | |
|---|---|---|
| 2,074,693 | Hooper | Mar. 23, 1937 |
| 2,167,350 | Eaton | July 25, 1939 |
| 2,495,808 | Colmant | Jan. 31, 1950 |
| 2,502,101 | Morgan et al. | Mar. 28, 1950 |
| 2,544,373 | West | Mar. 6, 1951 |
| 2,948,950 | Finger et al. | Aug. 16, 1960 |